(12) United States Patent
Chen et al.

(10) Patent No.: US 11,971,885 B2
(45) Date of Patent: Apr. 30, 2024

(54) RETRIEVAL AWARE EMBEDDING

(71) Applicant: ADOBE INC., San Jose, CA (US)

(72) Inventors: Fengbin Chen, San Jose, CA (US); Venkat Barakam, Cupertino, CA (US); Benjamin Leviant, Mountain View, CA (US); Amine Ben Khalifa, Sunnyvale, CA (US); Kerem Turgutlu, Ames, IA (US); Jayant Kumar, San Jose, CA (US); Sumeet Zaverilal Gala, Milpitas, CA (US); Gaurav Kukal, Fremont, CA (US); Vipul Dalal, Cupertino, CA (US)

(73) Assignee: ADOBE INC., San Jose, CA (US)

( * ) Notice: Subject to any disclaimer, the term of this patent is extended or adjusted under 35 U.S.C. 154(b) by 262 days.

(21) Appl. No.: 17/172,986

(22) Filed: Feb. 10, 2021

(65) Prior Publication Data

US 2022/0253435 A1    Aug. 11, 2022

(51) Int. Cl.
*G06F 16/00*  (2019.01)
*G06F 16/245*  (2019.01)
*G06N 3/04*  (2023.01)
*G06N 3/08*  (2023.01)

(52) U.S. Cl.
CPC ............. *G06F 16/245* (2019.01); *G06N 3/04* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 2017/0228344 A1* | 8/2017 | Narayanaswami | G06F 17/14 |
| 2018/0190377 A1* | 7/2018 | Schneemann | A61B 5/7485 |
| 2019/0347256 A1* | 11/2019 | Wu | G06F 16/2462 |
| 2020/0004835 A1* | 1/2020 | Ramanath | G06F 16/24578 |
| 2020/0166611 A1* | 5/2020 | Lin | G01S 13/0209 |
| 2020/0311542 A1* | 10/2020 | Wang | G06F 18/2413 |
| 2021/0097141 A1* | 4/2021 | Lillelund | G06F 40/30 |
| 2021/0241460 A1* | 8/2021 | Sakai | G06T 7/11 |

OTHER PUBLICATIONS

1 Makhzani, et al., "k-Sparse Autoencoders", arXiv preprint arXiv:1312.5663, 9 pages, Mar. 22, 2014.
2 Kalantidis, et al., "Locally Optimized Product Quantization for Approximate Nearest Neighbor Search", In Proceedings of the IEEE Conference on Computer Vision and Pattern Recognition 2014, pp. 2321-2328.

* cited by examiner

*Primary Examiner* — Anhtai V Tran
(74) *Attorney, Agent, or Firm* — F. CHAU & ASSOCIATES, LLC

(57) ABSTRACT

Systems and methods for information retrieval are described. Embodiments generate a dense embedding for each of a plurality of media objects to be searched, generate a sparse embedding for each of the media objects using an encoder that takes the dense embedding as an input, wherein the sparse embedding satisfies a sparsity constraint that is applied to at least one layer of the encoder during training, and perform a search on the plurality of media objects based at least in part on the sparse embedding.

18 Claims, 7 Drawing Sheets

RETRIEVAL AWARE EMBEDDING

BACKGROUND

The following relates generally to information retrieval, and more specifically to information retrieval using machine learning.

Information retrieval refers to the task of extracting information resources based on a query. In some cases, information retrieval includes identifying relevant search objects from a database and comparing the search objects to a query object. For example, a user may provide a text description or an image as a query, and a search engine may find images that are similar or relevant to the query.

In some cases, information retrieval systems represent query objects and search objects as multi-dimensional vectors in an embedding space. The vector representations may capture the semantic meaning and other attributes such as color information, meta-data or classification tags. An information retrieval system such as a search engine can retrieve relevant documents by comparing the embedded representation of the query to the embedded representations of the documents stored in a database (i.e., the search objects). Recently, information retrieval systems have used neural networks and other sophisticated embedding systems to generate complex, high dimensional embeddings that are capable of comparing and differentiating a large number of different text or image objects.

However, the embedding systems used by these information retrieval systems produce dense and high-dimensional vector representations. Comparing a large number of these representations is computationally expensive and therefore difficult to scale. As a result, they cannot practically be used for very large scale databases. Therefore, there is a need in the art for an improved embedding system that is efficient and scalable to large datasets.

SUMMARY

The present disclosure describes systems and methods for information retrieval. Embodiments of the disclosure provide a retrieval network trained using machine learning techniques to embed objects using a representation that enables efficient search. For example, the retrieval network may be trained using a sparsity constraint, which results in sparse embeddings for media objects such as text documents or images. Similar to text search, each dimension can be treated as an abstract token and can be indexed in inverted index for efficient retrieval by a search engine. In some examples, auto-encoder training techniques are used to train the retrieval network without the use of annotated training data.

A method, apparatus, and non-transitory computer readable medium for information retrieval are described. Embodiments of the method, apparatus, and non-transitory computer readable medium are configured to generate a dense embedding for each of a plurality of media objects to be searched, generate a sparse embedding for each of the media objects using an encoder that takes the dense embedding as an input, wherein the sparse embedding satisfies a sparsity constraint that is applied to at least one layer of the encoder during training, and perform a search on the plurality of media objects based at least in part on the sparse embedding.

An apparatus and method for information retrieval are described. Embodiments of the apparatus and method include an embedding component configured to generate a dense embedding for a plurality of media objects, an encoder configured to generate a sparse embedding based on the dense embedding, wherein the sparse embedding satisfies a sparsity constraint and at least one layer of the encoder is limited by the sparsity constraint during training, and a search component configured to perform a search of the media objects based at least in part on the sparse embedding.

A method, apparatus, and non-transitory computer readable medium for training an encoder are described. Embodiments of the method, apparatus, and non-transitory computer readable medium are configured to encode an embedding vector corresponding to a media object to produce an encoding vector, apply a sparsity constraint on the encoding vector to produce a sparse encoding vector, decode the encoding vector to produce a predicted embedding vector, compare the embedding vector to the predicted embedding vector, iteratively update parameters of the encoder based on the comparison to train the encoder, encode a plurality of media objects using the trained encoder, and perform a search of the media objects based on the encoding of the media objects. In some examples, the embedding vector is compared to the predicted embedding vector using an L2 loss function (i.e., a least square loss function).

DETAILED DESCRIPTION

The present disclosure describes systems and methods for information retrieval. Embodiments of the disclosure provide a retrieval network trained using machine learning techniques. The retrieval network is subject to a sparsity constraint that results in the generation of sparse embeddings. As a result, the embedded objects can be compared efficiently during information retrieval.

Recently, information retrieval systems (i.e., search engines) have used embedding networks to represent query objects and search objects in a common embedding space using dense, high-dimensional vector representations. Because these dense embeddings have a high number of non-zero dimensions, searching them places a heavy demand on storage and computation resources. As a result, these systems are not scalable and cannot perform real time searching of very large datasets.

By contrast, embodiments of the present disclosure provide an improved retrieval network that can search very large scale databases in real time. In some examples, the retrieval network generates an initial dense embedding of search objects, and then converts the initial embeddings into high dimensional sparse embeddings using a neural network encoder subject to a sparsity constraint.

By applying the unconventional step of applying a sparsity constraint to the encoder, embodiments of the present disclosure provide sparse embeddings that can be more efficiently searched. In some cases, the sparse embeddings include a higher number of dimensions than the initial dense embeddings. However, many of the dimensions have a value of zero. Searching based on sparse embeddings results in improved efficiency even when using higher dimensional representations.

Embodiments of the present disclosure may be used in the context of a search engine. For example, a retrieval network based on the present disclosure may take natural language text or an image as a query, and efficiently search through millions of images to find images relevant to the query. An example of an application of the inventive concept in the image search context is provided with reference to FIGS. 1 and 2. Details regarding the architecture of an example retrieval network are provided with reference to FIGS. 3 and 4. Examples of a process for generating sparse embeddings are provided with reference to FIGS. 5 and 6. A description of an example training process is described with reference to FIG. 7.

Image Search Application

Figure 1:
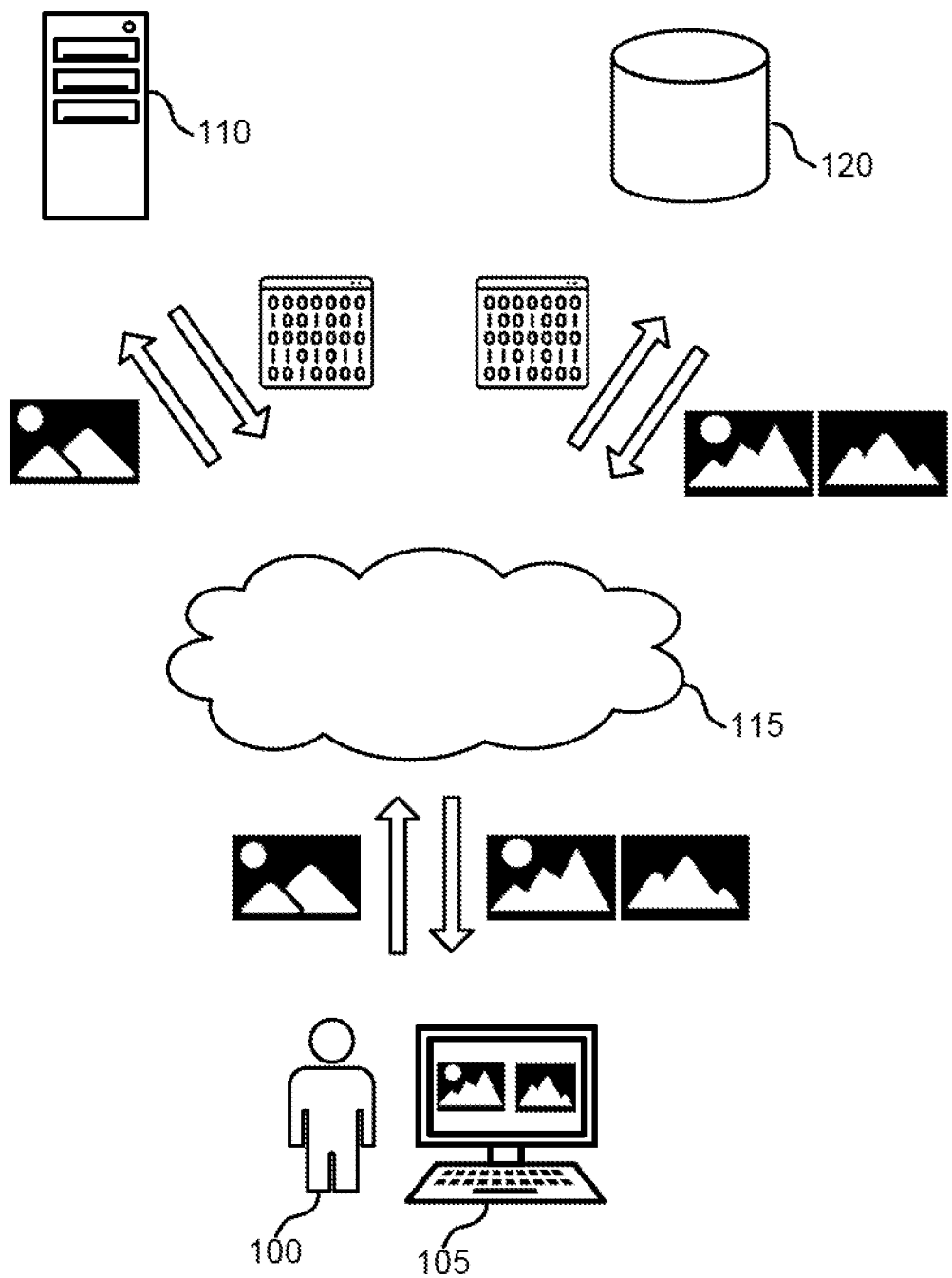
FIG. 1 shows an example of a system for information retrieval according to aspects of the present disclosure.

FIG. 1 shows an example of a system for information retrieval according to aspects of the present disclosure. The example shown includes user 100, user device 105, retrieval network 110, cloud 115, and database 120. Retrieval network 110 is an example of, or includes aspects of, the corresponding element described with reference to FIG. 3.

In the example of FIG. 1, both the query and the search objects are images. However, other types of queries and search objects may be used. In some examples, the query is of a different media type than the search objects. For example, the query can be a natural language query and the search objects can be images. In some examples, the search objects themselves include different media types (e.g., audio files, video files, image files, and text files).

The user 100 communicates with the retrieval network 110 via the user device 105 and the cloud 115. For example, the user 100 may provide a query object such as a text query or an image query. In the example illustrated in FIG. 1, the query object includes an image representing a natural landscape. The user device 105 transmits the search query to the retrieval network 110 to find related objects or information (i.e., search objects stored within the database 120). In some examples, the user device 105 communicates with the retrieval network 110 via the cloud 115.

The retrieval network 110 generates a sparse embedding for the query object and compares the sparse query embedding to sparse embeddings for search objects stored in database 120. The database 120 returns one or more images related to the sparse query embedding. The matching images are presented to the user 100. The process of using the retrieval network 110 to perform an image search is further described with reference to FIG. 2.

Prior to performing the search, the retrieval network 110 may be trained and then used to embed the search objects and query objects in a common embedding space in which each of the objects is represented as a sparse embedding. In some cases, the objects are represented using a dense embedding and then converted to a sparse embedding.

Dense embeddings and sparse embeddings are both multi-dimensional vectors that represent the objects in a vector space. A dense embedding may not have constraints on the number of non-zero values, and therefore may have a large number of non-zero values relative to the number of dimensions. A sparse embedding is a multi-dimensional vector subject to a sparsity constraint. For example, a threshold number of values may be identified, and all the sparse embeddings of the objects may be limited to having less than or equal the threshold number of non-zero values.

According to some embodiments, the number of dimensions of the sparse embedding can be larger than the number of dimensions of the dense embedding. However, due to the sparsity constraint, the number of non-zero values of the sparse embeddings is generally significantly smaller than the number of non-zero values of the dense embeddings.

The user device 105 may be a personal computer, laptop computer, mainframe computer, palmtop computer, personal assistant, mobile device, or any other suitable processing apparatus.

The retrieval network 110 includes a computer implemented network that generates a sparse embedding for each of a set of media objects to be searched, and performs a search on a set of media objects using the sparse embedding. According to some embodiments, the retrieval network 110 includes an embedding component, an encoder, and a search component. The embedding component generates an initial dense embedding for each of the media objects. The encoder takes the dense embedding as an input and generates sparse embedding for each of the set of media objects. A sparsity constraint is applied to at least one layer of the encoder during training.

The retrieval network 110 may also include a processor unit, a memory unit, a user interface, and a training component. The training component is used to train the encoder of the retrieval network. Additionally, the retrieval network 110 can communicate with the database 120 via the cloud 115. In some cases, the architecture of the retrieval network 110 is also referred to as a retrieval aware embedding (RAE) model. Further detail regarding the architecture of the retrieval network 110 is provided with reference to FIGS. 3 and 4. Further detail regarding the operation of the retrieval network 110 is provided with reference to FIGS. 5 and 6.

In some cases, the retrieval network 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

In some examples, the retrieval network 110 is an information retrieval system or a search system that performs image or document search based on content understanding. The retrieval network 110 can be used to identify objects, subjects, action, tone, emotion, concepts, aesthetics, style, and media types such as images, videos, documents, composites, etc. Based on information of the content, the retrieval network 110 can provide discovery and search experiences where boundaries across different kind of content and input modalities become blurring.

In some examples, the retrieval network 110 takes original information as input and represent such information in textual form, where a subsequent search depends on the textual representation. In some cases, the retrieval network 110 is able to accurately represent the original information (e.g., non-textual) as a dense embedding using an embedding component. In one embodiment, the retrieval network 110 captures text representation irrespective of types of content or information (e.g., image, audio, video, composites, 3D, etc.).

In some embodiments, the retrieval network 110 includes an artificial neural network to generate a sparse embedding for each of the media objects. An artificial neural network is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

During the training process, these weights are adjusted to increase the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

According to some embodiments, deep learning techniques may be used to map information or content into a multi-dimensional embedding space. The embedding space provides representation that is independent of content type or language. This kind of representation may blur the lines of content types or input modalities or language modalities for information retrieval.

In some examples, a training component is used to train the encoder of the retrieval network. A loss function is used during the training and the parameters of the encoder are iteratively updated based on comparison. After training, the trained encoder is used to generate a sparse embedding for each of the media objects and a sparse query embedding for the query object. An example of a process for training the encoder will be described in greater detail in FIG. 7.

A cloud 115 is a computer network configured to provide on-demand availability of computer system resources, such as data storage and computing power. In some examples, the cloud 115 provides resources without active management by the user. The term cloud 115 is sometimes used to describe data centers available to many users over the Internet. Some large cloud networks have functions distributed over multiple locations from central servers. A server is designated an edge server if it has a direct or close connection to a user. In some cases, a cloud 115 is limited to a single organization. In other examples, the cloud 115 is available to many organizations. In one example, a cloud 115 includes a multi-layer communications network comprising multiple edge routers and core routers. In another example, a cloud 115 is based on a local collection of switches in a single physical location.

The database 120 stores the media objects and the respective sparse embeddings for each of the media objects. In some examples, one or more of the stored media objects are retrieved from the database 120 as a result of a search by the information retrieval network 110.

A database 120 is an organized collection of data. For example, a database 120 stores data in a specified format known as a schema. A database 120 may be structured as a single database, a distributed database, multiple distributed databases, or an emergency backup database. In some cases, a database controller may manage data storage and processing in a database 120. In some cases, a user interacts with database controller. In other cases, database controller may operate automatically without user interaction. In some examples, the database 120 includes a set of media objects (e.g., image files). In some cases, a search is performed based on the sparse query embedding for the query object (e.g., a search image file), and at least one image file is retrieved from the database 120. In some other cases, no images are retrieved and returned to the user due to lack of similarity based on the sparse query embedding.

Figure 2:
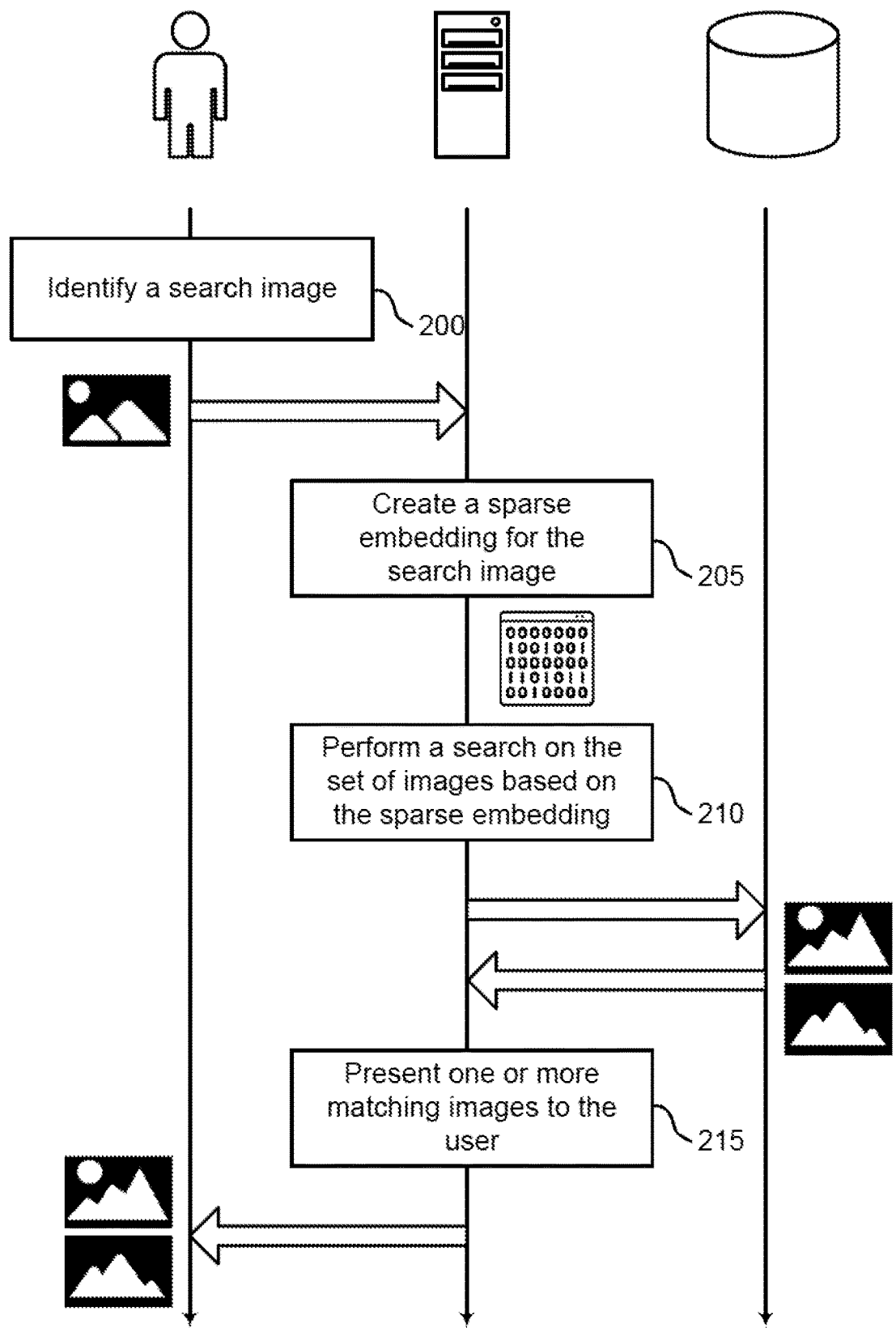
FIG. 2 shows an example of a process for information retrieval according to aspects of the present disclosure.

FIG. 2 shows an example of a process for information retrieval according to aspects of the present disclosure. In some examples, these operations are performed by a system such as the information retrieval system of claim 1. The system may include a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 200, the user identifies a search image. According to an example, the search image includes a natural landscape (e.g., the search image includes the sun and mountains). The search image herein is for illustrative purpose. However, in practice, a search image may be more complex. Furthermore, embodiments of the present disclosure are not limited to image queries. In some cases, the query object can be an audio file, video file, image file, natural language text, text file or any combination of thereof. In some cases, the operations of this step may be performed by a user as described with reference to FIG. 1, using a user interface as described with reference to FIG. 3.

At operation 205, the system creates a sparse embedding for the search image. According to an embodiment, an encoder is used to generate a sparse embedding based on a dense embedding of the search image. The sparse embedding can have a higher number of dimensions than the dense embedding. In some cases, the operations of this step refer to, or may be performed by, an encoder of retrieval network as described with reference to FIGS. 1 and 3.

In some examples, a document may include several embeddings (e.g., embeddings based on foreground, background, color, light, aesthetics). An information retrieval engine depends on parallel execution of retrieval request against several embeddings for running at scale. The retrieval network is applicable in morphing an embedding into information retrieval imperatives. Furthermore, the retrieval network may be configured to map query (e.g., text, image, or a combination thereof) to target retrieval aware embeddings associated with the document space. The retrieval network may be further configured to include a multi-task learning network.

At operation 210, the system performs a search on the set of images based on the sparse embedding. According to an embodiment, the system generates a sparse embedding for each of a set of images stored in the database (i.e., during an offline embedding period prior to the search, as described in FIG. 1). The respective sparse embedding for each image is also stored in the database.

The system is configured to compare the values of the sparse embedding for images in the database to values of the query embedding (i.e., the sparse embedding of the query object) based on pre-determined standards. For example, a distance metric may be used to identify objects that are close to the query object in the embedding space. In another example, the system identifies objects having at least a threshold number of overlapping dimensions with non-zero values. In some cases, the operations of this step refer to, or may be performed by, a search component as described with reference to FIG. 3.

At operation 215, the system presents one or more matching images to the user. The use is able to view the matching images presented. The user can choose to refine the search results by running an additional search (i.e., by selecting an image from the search results and using the selected image as a new query). In some cases, the operations of this step refer to, or may be performed by, a user interface as described with reference to FIG. 3.

The retrieval network 110 can efficiently and accurately compare a query object and a set of media objects in a common and sparse embedding space, and scale to millions of contents. As a result, the system can be further applied to multiple embeddings. For example, the query may include multiple embeddings such as a content embedding, a color embedding, a style embedding, a background embedding, etc. Each query embedding search in its corresponding embedding space and the final output is a combination of match of the multiple embeddings.

Network Architecture

Figure 3:
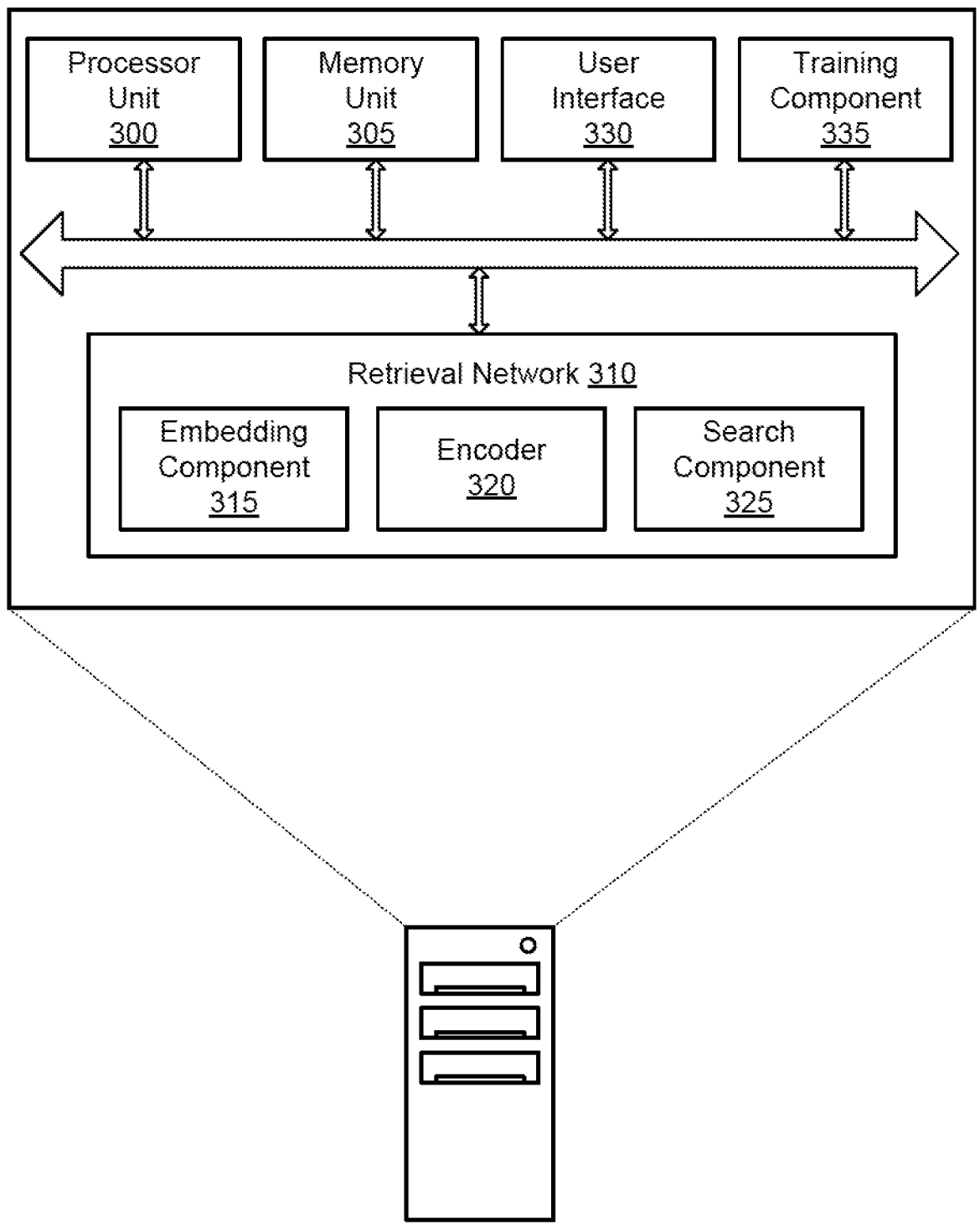
FIG. 3 shows an example of an apparatus for information retrieval according to aspects of the present disclosure.

FIG. 3 shows an example of an apparatus for information retrieval according to aspects of the present disclosure. The example shown includes processor unit 300, memory unit 305, retrieval network 310, user interface 330, and training component 335. Retrieval network 310 is an example of, or includes aspects of, the corresponding element described with reference to FIG. 1.

In one embodiment, retrieval network 310 includes embedding component 315, encoder 320, and search component 325. According to this embodiment, embedding component 315 is configured to generate a dense embedding for a set of media objects, encoder 320 is configured to generate a sparse embedding based on the dense embedding, wherein the sparse embedding satisfies a sparsity constraint and at least one layer of the encoder 320 is limited by the sparsity constraint during training, and search component 325 is configured to perform a search of the media objects based at least in part on the sparse embedding.

A processor unit 300 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor unit 300 is configured to operate a memory array using a memory controller. In other cases, a memory controller is integrated into the processor unit 300. In some cases, the processor unit 300 is configured to execute computer-readable instructions stored in a memory to perform various functions. In some embodiments, a processor unit 300 includes special purpose components for modem processing, baseband processing, digital signal processing, or transmission processing.

Examples of a memory unit 305 include random access memory (RAM), read-only memory (ROM), or a hard disk. Examples of memory unit 305 include solid state memory and a hard disk drive. In some examples, memory unit 305 is used to store computer-readable, computer-executable software including instructions that, when executed, cause a processor to perform various functions described herein. In some cases, the memory unit 305 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory unit 305 store information in the form of a logical state.

According to some embodiments, embedding component 315 generates a dense embedding for each of a set of media objects to be searched. In some examples, the media objects include image files. In some examples, the media objects include at least two media types from a set including audio files, video files, image files, and text files.

According to some embodiments, embedding component 315 is configured to generate a dense embedding for a set of media objects. In some examples, embedding component 315 is configured to generate an additional dense embedding for additional media objects having a different media type from the plurality of media objects. Embedding component 315 is an example of, or includes aspects of, the corresponding element described with reference to FIG. 6.

According to some embodiments, encoder 320 generates a sparse embedding for each of the media objects taking the dense embedding as an input, where the sparse embedding satisfies a sparsity constraint that is applied to at least one layer of the encoder 320 during training. In some examples, the sparse embedding has a higher number of dimensions than the dense embedding.

In some examples, the at least one layer of the encoder 320 includes an intermediate layer of an auto-encoder during a training phase. In some examples, the sparsity constraint includes a limit on a number of non-zero parameters in the at least one layer of the encoder 320.

According to some embodiments, encoder 320 is configured to generate a sparse embedding based on a dense embedding, wherein the sparse embedding satisfies a sparsity constraint and at least one layer of the encoder 320 is limited by the sparsity constraint during training.

According to some embodiments, encoder 320 encodes an embedding vector corresponding to a media object to produce an encoding vector. In some examples, encoder 320 applies a sparsity constraint on the encoding vector to produce a sparse encoding vector. In some examples, a trained encoder 320 encodes a set of media objects. In some examples, the sparsity constraint includes a limit on a number of non-zero parameters in at least one layer of the encoder 320. Encoder 320 is an example of, or includes aspects of, the corresponding element described with reference to FIG. 6.

According to an embodiment, the retrieval network 310 uses a k-sparse autoencoder to convert an initial dense embedding to a relatively high dimensional sparse embedding. The autoencoder includes at least an input layer, embedding layer, and decoding layer. The input layer of the autoencoder may include the initial dense embedding. The middle layer or the embedding layer is sometimes referred to as a k-sparse layer encoder, where only k largest ReLU hidden units are selected, and the others are set to zero. The output layer of the autoencoder is a decoder which is used to reconstruct the original or initial embedding. The architecture of the autoencoder will be described in greater detail in FIG. 4.

According to some embodiments, search component 325 performs a search on the set of media objects based on the sparse embedding. In some examples, search component 325 identifies a matching object similar to the query object based on the search. In some examples, search component 325 identifies a matching object corresponding to the text query based on the search. In some other examples, search component 325 identifies a stored media object based on the search.

According to some embodiments, search component 325 is configured to perform a search of the media objects based at least in part on the sparse embedding. The search component 325 performs a search of the media objects based on the encoding of the media objects. In some cases, the search component 325 is configured to retrieve a set of media objects stored in the database based on matching a predetermined number of dimensions with values of the query embedding (i.e., embedding of a query object from the user). The search component 325 delivers the retrieved set of media objects to user interface 330.

According to some embodiments, user interface 330 receives a query object of the set of media objects. In some examples, user interface 330 presents the matching object to a user. In some examples, user interface 330 receives a text query. After running a search to produce a matching object, the user interface 330 presents the matching object to a user. In some cases, the matching object is not limited to one object, and the user interface 330 presents more than one matching objects. In some examples, the query object is an image file selected or uploaded from the user to an image search engine. The matching object is also an image file that is similar to the query object (e.g., have similar semantic meaning).

According to some embodiments, training component 335 compares the embedding vector to the predicted embedding vector. In some examples, training component 335 iteratively updates parameters of the encoder 320 based on the comparison to train the encoder 320. In some examples, training component 335 computes a loss function based on the comparison, where the parameters are updated based on the loss function. In some examples, the loss function includes a square distance between the embedding vector and the predicted embedding vector. In some examples, the loss function includes a component that encourages even distribution across dimensions. An example training process is described with reference to FIG. 7.

A method of providing an apparatus for information retrieval includes providing an embedding component configured to generate a dense embedding for a plurality of media objects, an encoder configured to generate a sparse embedding based on the dense embedding, wherein the sparse embedding satisfies a sparsity constraint and at least one layer of the encoder is limited by the sparsity constraint during training, and a search component configured to perform a search of the media objects based at least in part on the sparse embedding.

In some examples, the at least one layer of the encoder comprises an intermediate layer of an auto-encoder during a training phase. In some examples, the sparsity constraint comprises a limit on a number of non-zero parameters in the at least one layer of the encoder. In some examples, the sparse embedding has a higher number of dimensions than the dense embedding. Some examples of the apparatus and method described above further include a database for storing the plurality of media objects.

Some examples of the apparatus and method described above further include an additional embedding component configured to generate an additional dense embedding for additional media objects having a different media type from the plurality of media objects.

The described systems and methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

Figure 4:
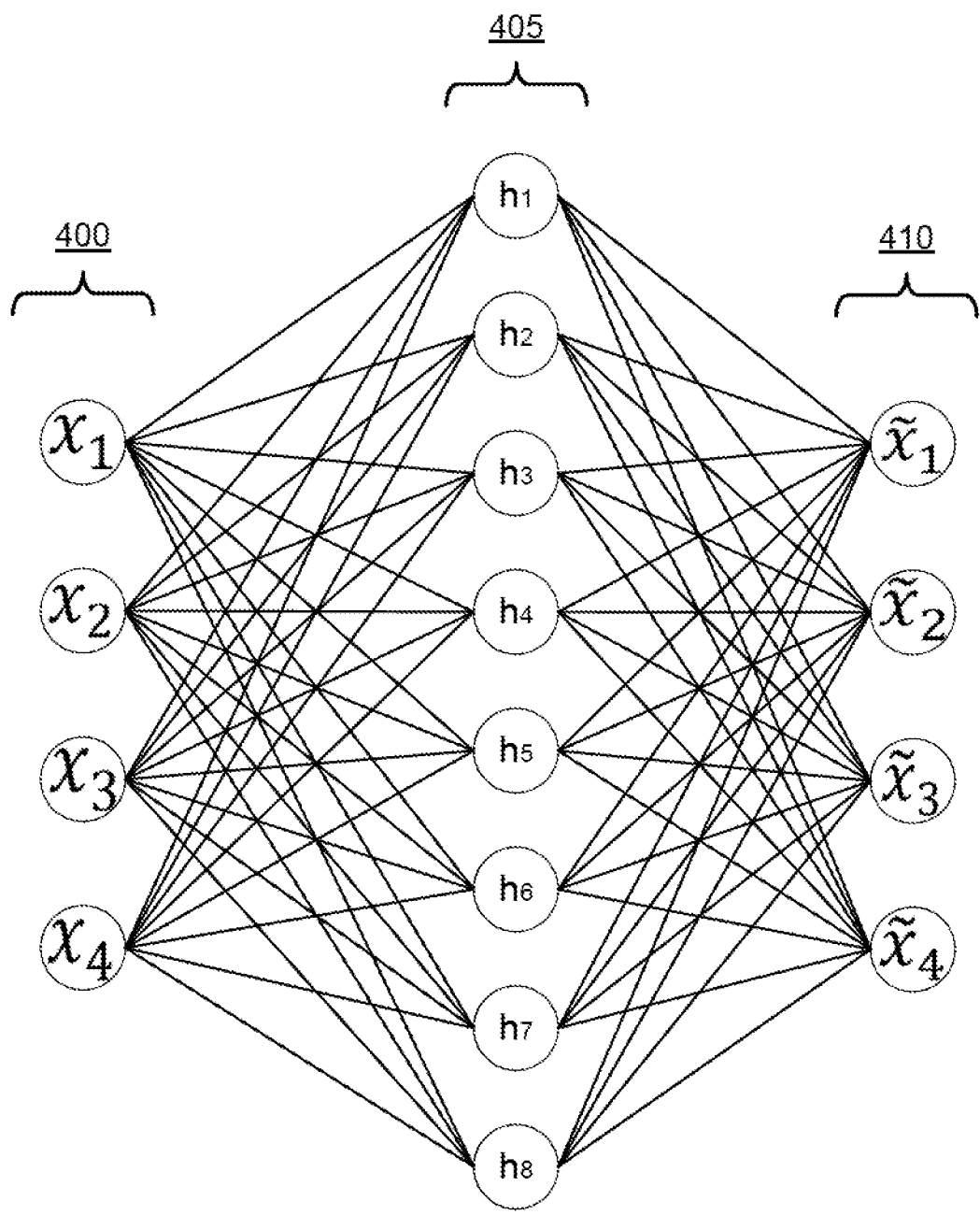
FIG. 4 shows an example of a retrieval aware autoencoder according to aspects of the present disclosure.

FIG. 4 shows an example of a retrieval aware autoencoder according to aspects of the present disclosure. The example shown includes input layer 400, embedding layer 405, and decoding layer 410. According to an embodiment, the encoder 320 includes an intermediate portion of a retrieval aware autoencoder during a training phase. For example, the decoding layer 410 may be discarded (or simply not used) after the training phase.

The example shown is for illustrative purpose and embodiments of the present disclosure are not limited thereto. In some examples, the number of nodes in the input layer 400, the embedding layer 405, and decoding layer 410 is more than the number shown. In some cases, the decoding layer 410 is also referred to as an output layer.

According to some embodiments, a sparsity constraint may be applied to the embedding layer 405. When representations are learned in a way that encourages sparsity, performance is increased on various classification tasks. Methods based on sparsity of representations include activation functions, sampling steps, and various types of penalties. For example, a k-sparse autoencoder is an autoencoder with linear activation function such as a rectified linear unit (ReLU), where only the k largest activities are kept in hidden layers.

The k-sparse autoencoder increases in performance of classification results when applied to the MNIST and NORB datasets than denoising autoencoders, networks trained with dropout, and Restricted Boltzmann Machines (RBMs). In some cases, the k-sparse autoencoder is relatively easy during the training stage while the encoding stage is fast. The k-sparse autoencoder identifies the k largest hidden units and sets the others to zero. In some cases, the identification process is done by sorting the activities or by using ReLU hidden units with thresholds that are adaptively adjusted until the k largest activities are identified. In some cases, an autoencoder includes a linear encoder and a decoder, but the autoencoder is subject to a sparsity constraint and can keep only k non-zero elements in the hidden layers.

According to some embodiments, the retrieval network applies a k-sparse autoencoder to convert an original dense embedding to a high dimensional sparse embedding. Applying the autoencoder, the retrieval network expands the dimension and at the same time make it sparse for efficient retrieval. In an embodiment, ReLU activation function is used in the retrieval network.

The input layer 400 includes the original dense embedding, for example, a 2048-dimensional stock7dot1 embedding. Further detail relating to the example of the stock7dot1is provided below with reference to FIGS. 6 and 7. The middle layer (i.e., embedding layer 405) may be a k-sparse layer encoder, where only k largest ReLU hidden units are selected, and the others are set to zero. For example, it may have an 8192 dimensional hidden layer size with 30 largest activities. However, embodiments of the present disclosure are not limited to k=30. The output layer (i.e., decoding layer 410) is a decoder to reconstruct the original embedding. In one embodiment, the loss function calculates the square distance between input layer and output layer.

According to an embodiment, the retrieval network maps original embedding into another high dimension space, where each dimension represents an abstract pattern, and a content is encoded as k abstract patterns with weights. Because the hidden size is n>>k, the inverted index of the retrieval network can be very sparse, and the sparser the inverted index is, the faster the information retrieval is. According to an embodiment, if the retrieval network is configured to increase the hidden size n and keep k the same, the capacity of the autoencoder becomes larger and leads to increase in accuracy of the model, and at the same time because the retrieval network becomes sparser, the speed is faster. It is beneficial to keep a large hidden size if enough training data is provided. It is convenient to obtain a large training dataset because autoencoder is unsupervised and labels are not needed in the dataset.

Embedding Process

Figure 5:
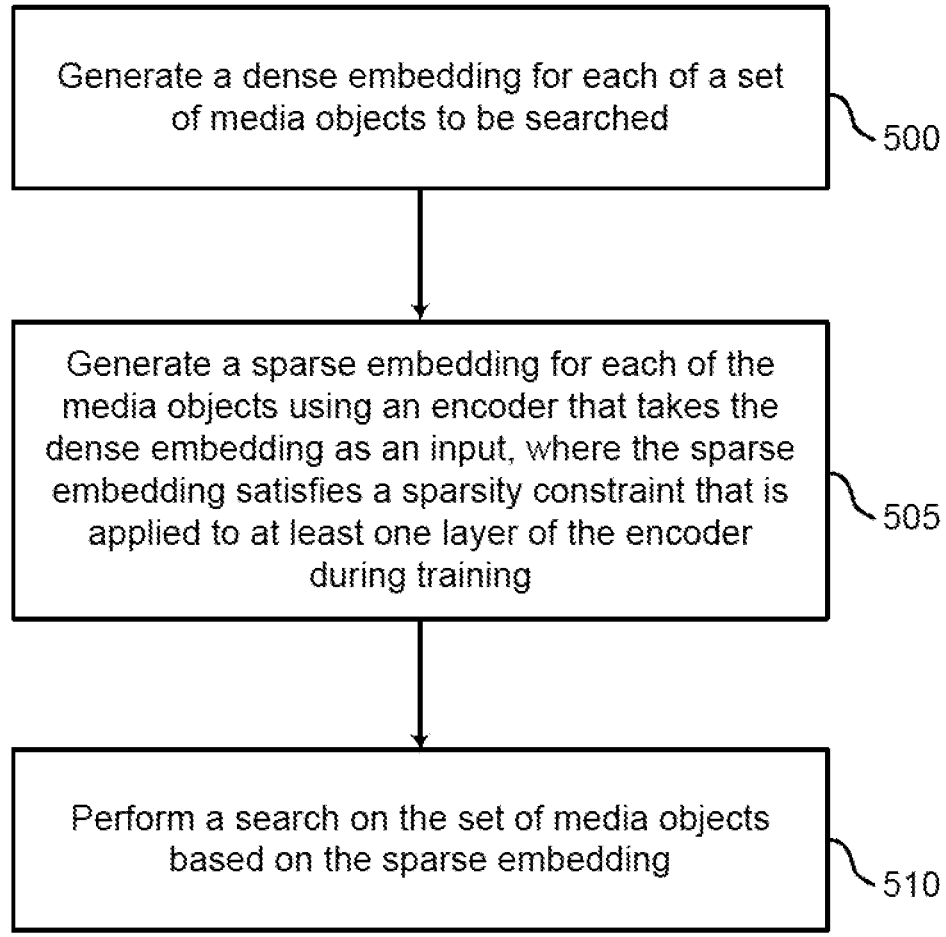
FIG. 5 shows an example of a process for information retrieval according to aspects of the present disclosure.

FIG. 5 shows an example of a process for information retrieval according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

A method for information retrieval is described. Embodiments of the method are configured to generate a dense embedding for each of a plurality of media objects to be searched, generate a sparse embedding for each of the media objects using an encoder that takes the dense embedding as an input, wherein the sparse embedding satisfies a sparsity constraint that is applied to at least one layer of the encoder during training, and perform a search on the plurality of media objects based at least in part on the sparse embedding.

At operation 500, the system generates a dense embedding for each of a set of media objects to be searched. In some examples, the set of media objects include image files. In some other examples, the media objects include at least two media types from a set including audio files, video files, image files, and text files. In some cases, the operations of this step refer to, or may be performed by, an embedding component as described with reference to FIGS. 3 and 6.

According to an embodiment, deep learning techniques are used to convert the set of media objects to be searched into a multi-dimensional space (e.g., a vector space). For example, deep learning techniques can map information or content into a multi-dimensional embedding space. The embedding space generates representation that is independent of content type or language. For example, network models for generating a dense embedding may include image to feature embeddings, language text to language embeddings (Word2Vec), etc. In some cases, embedding space might not be a weak proxy of the original content but rather a machine-learned representation that can increase performance with more iterations. Additionally, the dense embedding or the dense embedding space captures semantic information from each of the set of media objects and interdependence.

At operation 505, the system generates a sparse embedding for each of the media objects using an encoder that takes the dense embedding as an input, where the sparse embedding satisfies a sparsity constraint that is applied to at least one layer of the encoder during training. In some cases, the operations of this step refer to, or may be performed by, an encoder as described with reference to FIGS. 3 and 6. In some embodiments, the sparse embedding has a higher number of dimensions than the dense embedding.

Embodiments of the present disclosure provide an embedding-based retrieval approach, which is also referred to as retrieval aware embedding. According to some embodiments, the retrieval network encodes the original dense embedding to a high dimensional sparse embedding, and treats each dimension as an abstract word token. In this way, embedding retrieval becomes substantially similar to word token retrieval. This approach can produce similar response time as the text query, competitive accuracy, and is able to scale to hundreds of millions of assets.

According to some embodiments, each dimension has a scalar value to signify a magnitude, or significance of that dimension or length of the dimension. In some examples, the information represented by each dimension may include the notion of term frequency (TF). When a large part of a document corpus shares the same dimension of an embedding, it implies that this dimension is not discriminatory enough, mirroring low-score inverse document frequency (IDF) concept. Therefore, this dimension may be refined, or may be tempered down for retrieval. In some cases, the retrieval network increases the sensitivity of a commonly shared dimension by upscaling, e.g., upscaling 2048 dimensions to 8196 dimensions, to more relevant sub-dimensions therefore increasing IDF score for relevant sub-dimensions if feasible.

According to an embodiment, the retrieval network blends an embedding space into existing information retrieval paradigm including unstructured text and structured information in the same query. It can be used to build machine learning rankers in conjunction with other signals including text signals and behavioral signals. Cosine similarity, or some other vector similarity score, of a retrieval aware embedding may act as the weight of a ranking feature for a dimension and a document in a given recall.

In some cases, the retrieval network unlocks material dimensions for an input query, or retrieval request rather than focusing on all dimensions of an embedding, e.g., 2048 dimensions. Distribution and density within a dimension of all relevant dimensions lead to finer control over recall. According to an embodiment, the retrieval network may perform faceting of structured information over recall set, for example, staples of information retrieval at scale.

At operation 510, the system performs a search on the set of media objects based on the sparse embedding. In some cases, the operations of this step refer to, or may be performed by, a search component as described with reference to FIG. 3.

According to an embodiment, the retrieval network receives a query object and generates a sparse query embedding for the query object, wherein the search is based on the sparse query embedding. The retrieval network identifies a matching object similar to the query object based on the search and presents the matching object to a user. According to an embodiment, the retrieval network receives a text query, identifies a matching object corresponding to the text query based on the search, and presents the matching object to the user.

An apparatus for information retrieval is also described. The apparatus includes a processor, memory in electronic communication with the processor, and instructions stored in the memory. The instructions are operable to cause the processor to generate a dense embedding for each of a plurality of media objects to be searched, generate a sparse embedding for each of the media objects using an encoder that takes the dense embedding as an input, wherein the sparse embedding satisfies a sparsity constraint that is applied to at least one layer of the encoder during training, and perform a search on the plurality of media objects based at least in part on the sparse embedding.

A non-transitory computer readable medium storing code for information retrieval is also described. In some examples, the code comprises instructions executable by a processor to generate a dense embedding for each of a plurality of media objects to be searched, generate a sparse embedding for each of the media objects using an encoder that takes the dense embedding as an input, wherein the sparse embedding satisfies a sparsity constraint that is applied to at least one layer of the encoder during training, and perform a search on the plurality of media objects based at least in part on the sparse embedding.

Some examples of the method, apparatus, and non-transitory computer readable medium described above further include receiving a query object of the plurality of media objects. Some examples further include generating a sparse query embedding for the query object, wherein the search is based on the sparse query embedding. Some examples further include identifying a matching object similar to the query object based on the search. Some examples further include presenting the matching object to a user.

Some examples of the method, apparatus, and non-transitory computer readable medium described above further include receiving a text query. Some examples further include identifying a matching object corresponding to the text query based on the search. Some examples further include presenting the matching object to a user. In some examples, the sparse embedding has a higher number of dimensions than the dense embedding.

Some examples of the method, apparatus, and non-transitory computer readable medium described above further include storing the media objects and the sparse embedding in a database. Some examples further include identifying a stored media object based on the search. Some examples further include retrieving the stored media object from the database. In some examples, the at least one layer of the encoder comprises an intermediate layer of an auto-encoder during a training phase.

In some examples, the sparsity constraint comprises a limit on a number of non-zero parameters in the at least one layer of the encoder. In some examples, the media objects comprise image files. In some other examples, the media objects comprise at least two media types from a set comprising audio files, video files, image files, and text files.

Figure 6:
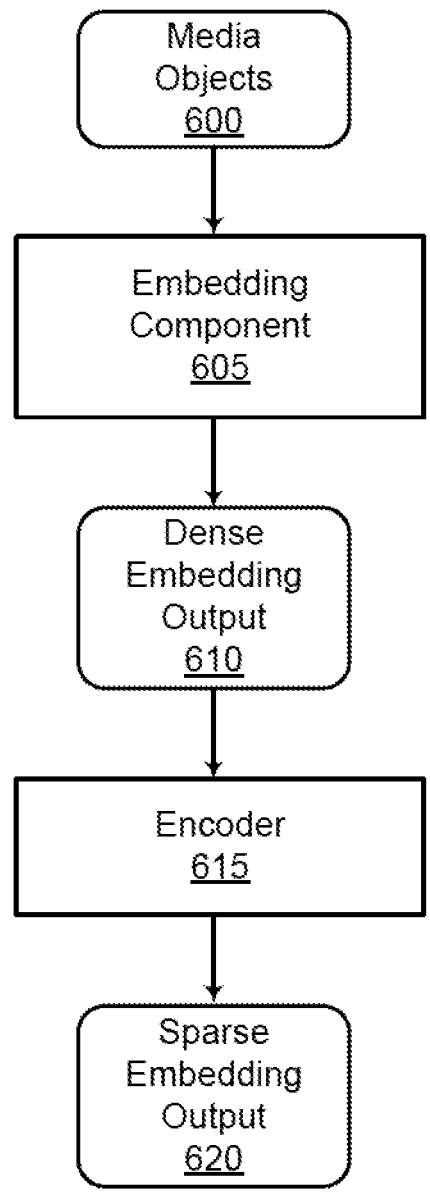
FIG. 6 shows an example of a retrieval network according to aspects of the present disclosure.

FIG. 6 shows an example of a retrieval network according to aspects of the present disclosure. The example shown includes media objects 600, embedding component 605, dense embedding output 610, encoder 615, and sparse embedding output 620. Embedding component 605 is an example of, or includes aspects of, the corresponding element described with reference to FIG. 3. Encoder 615 is an example of, or includes aspects of, the corresponding element described with reference to FIG. 3. In some cases, the retrieval network is also referred to as a retrieval aware embedding model.

According to some embodiments, during an offline embedding stage, a set of media objects 600 are input to the embedding component 605, which outputs the dense embedding output 610. The dense embedding output 610 is input to the encoder 615, which outputs a sparse embedding output 620 for each of the media objects 600. In some examples, the set of media objects 600 include image files.

In some examples, each image has a list of tags. For example, an image depicting British bulldog running on a beachhead may include multiple different tags. These tags include beach, bulldog, dog, ocean, pet, obedient, coast, water, canine, sand, tongue, puppy, waves, play, shore, ball, funny, moody, reflection, absurd, vacation, splash, snout, seaside, bright, swim, run, sky, ridiculous, etc.

Given an image, each tag has a score based on multiple ranking signals like number of downloads, click-through rate (CTR), behavioral data, etc. According to an example, the inverted index includes the following information:

TABLE 1

Example Tag Information

| Tag | Image 1 | Image 2 | Image 3 |
|---|---|---|---|
| dog | 100 | 100 | |
| cat | | 100 | |
| beach | 50 | 10 | |
| child | | | 100 |
| landscape | | | 50 |
| ... | | | |

For example, given the text query "dog beach", the score of image 1 is 100+50=150 (because image 1 matches tags "dog" and "cat"). The score of image 2 is 100+10=110. Image 3 does not match any of the tags, so this image is not in the recall (i.e., not shown to users). The text query returns results including image 1 and image 2.

In an example image dataset (i.e., an Adobe® Stock image set), each image may have a 2048-dimensional embedding called stock7dot1, which is used to do visual similarity search. The embedding is the fully connected layer before the output layer of a classifier, and since it uses rectified linear unit (ReLU) activation function, all values are positive. According to an example, the inverted index for embedding includes the following:

TABLE 2

Example Dense Embedding

| Dimension | Image 1 | Image 2 | Image 3 |
|---|---|---|---|
| dimension 1 | 0.11 | 1.23 | 3.56 |
| dimension 2 | 1.21 | 0.42 | 0.82 |
| dimension 3 | 0.15 | 0.53 | 2.47 |
| dimension 4 | 0.22 | 2.25 | 0.74 |
| ... | | | |
| dimension 2048 | 2.17 | 0.64 | 1.36 |

For visual similarity search, the input embedding is 2048-dimensional embedding, which recalls all the contents because every content matches all the dimensions. For each content, all dimensions match and similarity calculations are performed comparing with the input embedding. This is not efficient and cannot scale to very large datasets.

As illustrated in the above two tables, one difference is that the first table is much sparser than the second table. Embodiments of the present disclosure are provided to make the embedding sparse so that systems and methods can retrieve efficiently on dimensions, such as text search retrieval.

According to some embodiments, the retrieval network applies a k-sparse autoencoder to convert original dense embedding to high dimensional sparse embedding. Applying the autoencoder, the retrieval network expands the dimension and at the same time is configured to be very sparse for efficient information retrieval. In an embodiment, ReLU activation function is used in the retrieval network. The retrieval aware autoencoder will be described in greater detail in FIG. 4.

The retrieval network maps original embedding into another high dimensional space, where each dimension represents an abstract pattern, and a content is encoded as k abstract patterns with weights. Because the hidden size n>>k, so the inverted index of retrieval network is very sparse, and the sparser the inverted index is, the faster the retrieval is.

According to the example, the inverted index of the retrieval network is as follows:

TABLE 3

Example Sparse Embedding

| Dimension | Image 1 | Image 2 | Image 3 | Image 4 |
|---|---|---|---|---|
| dimension 1 | | 1.12 | | |
| dimension 2 | | | 0.81 | |
| dimension 3 | 1.16 | 0.83 | | 0.64 |
| dimension 4 | | | 1.83 | |
| ... | | | | |
| dimension 8192 | 0.13 | | | 0.01 |

According to the example sparse embedding above, n is 8192. To be included in the final recall returned to the user, an image should match at least d dimensions out of k dimensions with values of the query embedding. One example may assume d is set to one, use dot product as similarity function and consider five dimensions listed in the table. To find similar images of image 1 (here image 1 is the query embedding), image 2 matches one dimension and image 4 matches two dimensions such that they are both in the recall. According to this example, the score of image 2 is calculated as 1.16*0.83=0.96, and the score of image 4 is calculated as 1.16*0.64+0.13*0.01=0.74, so the search returns image 2 and image 4 as search results. Embodiments of the present disclosure are not limited to n=8192 and n can be other numbers larger than k.

Training and Evaluation

Figure 7:
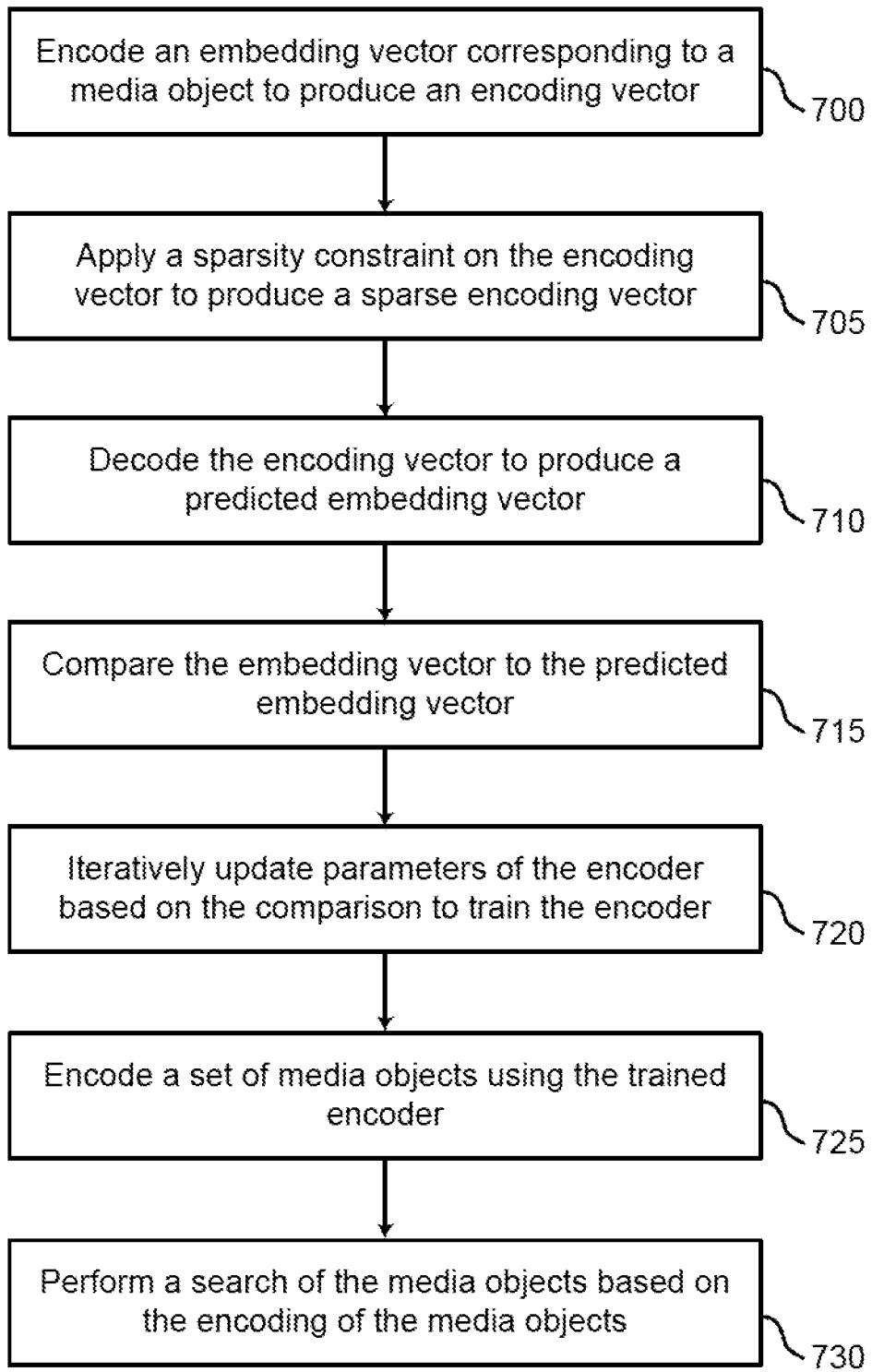
FIG. 7 shows an example of a process for training a retrieval network according to aspects of the present disclosure.

FIG. 7 shows an example of a process for training a retrieval network according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

A method for training an encoder is described. Embodiments of the method are configured to encode an embedding vector corresponding to a media object to produce an encoding vector, apply a sparsity constraint on the encoding vector to produce a sparse encoding vector, decode the encoding vector to produce a predicted embedding vector, compare the embedding vector to the predicted embedding vector, iteratively update parameters of the encoder based on the comparison to train the encoder, encode a plurality of media objects using the trained encoder, and perform a search of the media objects based on the encoding of the media objects.

At operation 700, the system encodes an embedding vector corresponding to a media object to produce an encoding vector. In some examples, the media object is an image file. According to an embodiment, a retrieval aware autoencoder includes an encoder, which is applied to encode an embedding vector corresponding to a media object to produce an encoding vector. In some cases, the operations of this step refer to, or may be performed by, an encoder as described with reference to FIGS. 3 and 6.

At operation 705, the system applies a sparsity constraint on the encoding vector to produce a sparse encoding vector. According to an embodiment, the middle layer of the retrieval aware autoencoder is k-sparse layer encoder, where only k largest ReLU hidden units are selected, and the others are set to zero. For example, the middle layer has an 8192 hidden layer size with 30 largest activities (i.e., n=8192, k=30). Because the hidden size n>>k, so the inverted index of the retrieval network is very sparse. In some cases, the operations of this step refer to, or may be performed by, an encoder as described with reference to FIGS. 3 and 6.

At operation 710, the system decodes the encoding vector to produce a predicted embedding vector. In some cases, the operations of this step refer to, or may be performed by, a decoding layer of a retrieval aware autoencoder as described with reference to FIG. 4.

At operation 715, the system compares the embedding vector to the predicted embedding vector. In some cases, the operations of this step refer to, or may be performed by, a training component as described with reference to FIG. 3.

An additional loss is incorporated to penalize uneven distribution in the loss function so that the encoder evenly distributes values across all dimensions. A loss function refers to a function that impacts how a machine learning model is trained in a supervised learning model. Specifically, during each training iteration, the output of the model is compared to the known annotation information in the training data. The loss function provides a value for how close the predicted annotation data is to the actual annotation data. After computing the loss function, the parameters of the model are updated accordingly, and a new set of predictions are made during the next iteration.

Within a training batch, x is input, m is k-sparse middle layer values and middle layer size is n, y is output. An example of the customized loss function is formulated as follows:

$$L = \lambda_1 \sum_i^{batchsize} \|x_i - y_i\| + \lambda_2 \sum_i^{batchsize} \sum_j^n m_{ij} * \left(\frac{p_j}{\text{batch size}} - \frac{k}{n}\right), \text{ where} \quad (1)$$

$$p_j = \sum_i^{batch size} I(m_{ij} > 0), \text{ and } I(\text{true}) = 1, I(\text{false}) = 0$$

The first part of the loss function is autoencoder loss, while the second part encourages even distribution across dimensions. For example, if percentage of activation in one dimension is higher than average k/n, gradient descent will decrease the values on that dimension, and thus less activation on that dimension because k-sparse middle layer only keeps top k activities. Additionally, if percentage of activation is lower than average k/n, gradient descent will increase the values on that dimension and thus more activation on that dimension.

At operation 720, the system iteratively updates parameters of the encoder based on the comparison to train the encoder. In some cases, the operations of this step refer to, or may be performed by, a training component as described with reference to FIG. 3.

At operation 725, the system encodes a set of media objects using the trained encoder. This is also referred to as the offline embedding stage as described in FIG. 1. The offline embedding stage includes embedding all of the media objects in the database before a user runs a search. According to some embodiments, the offline embedding stage depends on the encoder component of the autoencoder. In some cases, the operations of this step refer to, or may be performed by, an encoder as described with reference to FIGS. 3 and 6.

In some embodiments, the system generates a dense embedding for each of a plurality of media objects. Then, the system generates a sparse embedding for each of the media objects using an encoder that takes the dense embedding as an input, wherein the sparse embedding satisfies a sparsity constraint that is applied to at least one layer of the encoder during training.

At operation 730, the system performs a search of the media objects based on the encoding of the media objects. In some cases, the operations of this step refer to, or may be performed by, a search component as described with reference to FIG. 3.

According to some embodiments, to be included in the search results returned to the user, an image should match at least d dimensions out of k dimensions with values of the query embedding. In one example, d is set to one, which means each image in the returned search results must match at least 1 dimension from the inverted index based on the query embedding. According to an example, assume there are a set of four image files, and image 1 represents the query embedding. To search for images similar to image 1, image 2 matches one dimension and image 4 matches two dimensions, therefore, they are both in the recall (i.e., returned search results). In some cases, dot product is used as similarity function to calculate a score for each image of the set of image files.

An apparatus for training an encoder is also described. The apparatus includes a processor, memory in electronic communication with the processor, and instructions stored in the memory. The instructions are operable to cause the processor to encode an embedding vector corresponding to a media object to produce an encoding vector, apply a sparsity constraint on the encoding vector to produce a sparse encoding vector, decode the encoding vector to produce a predicted embedding vector, compare the embedding vector to the predicted embedding vector, iteratively update parameters of the encoder based on the comparison to train the encoder, encode a plurality of media objects using the trained encoder, and perform a search of the media objects based on the encoding of the media objects.

A non-transitory computer readable medium storing code for training an encoder is also described. In some examples, the code comprises instructions executable by a processor to encode an embedding vector corresponding to a media object to produce an encoding vector, apply a sparsity constraint on the encoding vector to produce a sparse encoding vector, decode the encoding vector to produce a predicted embedding vector, compare the embedding vector to the predicted embedding vector, iteratively update parameters of the encoder based on the comparison to train the encoder, encode a plurality of media objects using the trained encoder, and perform a search of the media objects based on the encoding of the media objects.

Some examples of the method, apparatus, and non-transitory computer readable medium described above further include computing a loss function based on the comparison, wherein the parameters are updated based on the loss function. In some examples, the loss function comprises a square distance between the embedding vector and the predicted embedding vector. In some examples, the loss function includes a component that encourages even distribution across dimensions. In some other examples, the sparsity constraint comprises a limit on a number of non-zero parameters in at least one layer of the encoder.

Performance of the apparatus and methods of the present disclosure have been evaluated, and results indicate embodiments of the present disclosure provide an improvement over existing technology. According to some embodiments, the retrieval network includes an inverted index that each content has values in k dimensions out of total n dimensions, where k<<n (in some cases, the network model is also referred to as retrieval aware embedding k-n or RAE k-n). This sparsity significantly increases the retrieval speed.

In a first iteration, it has been observed that RAE 30-8196 of stock7dot1 has a large recall size. On average it recalls more than 70% of contents. Most of contents are in the recall because they match at least one dimension. This is because values are not evenly distributed among dimensions. Most of values are concentrated in a few dimensions. For example, 45% contents have values in one dimension. Since most of contents have values in those few dimensions, they will be retrieved most of time in the inverted index and thus leads to high recall size and high response time. Percentage of contents in each dimension is recorded.

Referring to the training techniques illustrated in FIG. 7, it is found that adding the second part of the loss function has little impact on the first part autoencoder loss. This means by making the k values evenly distribute among n total dimensions, the encoder works equally well, but at the same time significantly reduces the recall size and increases the retrieval speed.

Adding the unevenness loss results in a more even distribution. The highest percentage now is 1.4%, compared to 45% before, and most of the dimensions have 0.2% to 0.6% of contents, while the average k/n=0.37%. The average recall size reduces from 70% to 10% of all contents and the retrieval speed is 7 times faster.

It has been observed that even RAE 30-8192 of stock7dot1 recalls around 10% of contents, the average overlap on dimensions with values between input embedding and content embedding in the recall is 1.3. Among the 10% of contents in the recall, 83% only have one dimension overlap with the input. Though the retrieval network searches 30 dimensions, since only a small fraction of contents has multiple overlaps with the input, RAE is equivalent to the single keyword text search recalling 10% of contents in terms of computation in the inverted index. Therefore, RAE has reached similar response time as text query on Stock. Percentage of contents in each dimension of RAE 30-8192 is recorded.

The retrieval network has good control on the accuracy of the encoder, recall size in the inverted index, retrieval speed and final recall size shown to the user. In some cases, the retrieval network is configured to have a low k value while maintaining reasonable accuracy, even for very complicated high dimensional embedding such as stock7dot1 where it needs to detect all types of objects, theme, color of the image. Embodiments of the present disclosure are not limited to these types of objects, theme, color of the image. If the network model decreases k, as a result accuracy is lower, recall size is lower but retrieval speed is higher. If the network model increases total dimensions n, then the accuracy is higher, recall size is lower and retrieval speed is higher, so in some cases the model is configured to have the size of n as high as possible. According to an embodiment, the final recall size shown to the user can be controlled, for example, should at least match d. The content (e.g., images) should match at least d dimensions out of k dimensions of the input embedding to be included in the final recall.

Apparatus and methods of the present disclosure are also compared to the product quantization technique. In some examples, a product quantizer is a type of vector quantizer which is used to accelerate approximate nearest neighbor (ANN) search. A product quantizer is used for implementing ANN search. Unlike tree-based indexes used for ANN, for example, a k-NN search with a product quantizer performs an exhaustive search, such that a product quantizer still requires comparing a query vector to every vector in the database. The benefit is that it approximates and simplifies the distance calculations. In some cases, the product quantizer approach includes dataset compression and conducting nearest neighbor search with compressed vectors.

A locally optimized product quantization (LOPQ) model includes a vector quantizer that combines low distortion with fast search. The LOPQ is applied to an ANN search in high dimensional spaces. Leveraging data structure such as inverted lists or a multi-index, LOPQ model can locally optimize an individual product quantizer per cell and use it to encode residuals. It is fast to train the LOPQ model. Space and time overhead are decreased on several public datasets.

ANN search in high-dimensional spaces is a task in computer vision. Some previous methods maintain all data points in a memory and efficient data structures are used to compute a limited number of exact distances. Product quantization (PQ) is a compact encoding method that is discrete and can be used for exhaustive or non-exhaustive search through inverted indexing or multi-indexing. Other methods used for approximate nearest neighbor search tasks include optimized product quantization (OPQ) and Cartesian k-means.

Adobe® Stock uses product quantization for embedding-based visual similarity search with elastic search. In total, Adobe® Stock has 200 million contents belonging to 1024 clusters. Given an input embedding, closest 20 clusters are retrieved based on distance between input embedding and cluster centroids. Because product quantization is computationally expensive (e.g., consuming a large memory), in some cases, the similarity search is run on top 100 thousand results as a rescore function.

Evaluation includes randomly selecting one million contents from stock and compare the accuracy of RAE with a model using product quantization. The evaluation is conducted based on both recall@R and overlap@R measures. The recall@R is defined to measure the proportion of queries having their nearest neighbor ranked in the first R positions. The overlap@R is defined to measure the fraction of true nearest neighbors in first R positions.

Evaluation includes comparing product quantization with RAE 50-2048 and RAE 30-2048 of the stock7dot1 embedding. It is found that RAE 30-2048 not only retrieves much faster than product quantization, but also provides increased accuracy.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for information retrieval, comprising:
generating a dense image embedding for each of a plurality of media objects to be searched;
generating a sparse image embedding with a higher number of dimensions than the dense image embedding for each of the media objects using an encoder that takes the dense image embedding as an input, wherein the sparse image embedding is generated using an activation function including a sparsity constraint that limits a number of non-zero parameters at a hidden layer of the encoder;
performing a search on the plurality of media objects based at least in part on the sparse image embedding; and
retrieving a matching object from the plurality of media objects based on the search.

2. The method of claim 1, further comprising:
receiving a query object of the plurality of media objects;
generating a sparse query embedding for the query object, wherein the search is based on the sparse query embedding;
identifying the matching object similar to the query object based on the search; and
presenting the matching object to a user.

3. The method of claim 1, further comprising:
receiving a text query;
identifying the matching object corresponding to the text query based on the search; and
presenting the matching object to a user.

4. The method of claim 1, further comprising:
storing the media objects and the sparse image embedding in a database;
identifying a stored media object based on the search; and
retrieving the stored media object from the database.

5. The method of claim 1, wherein:
at least one layer of the encoder comprises an intermediate layer of an auto-encoder during a training phase.

6. The method of claim 1, wherein:
the sparsity constraint comprises a limit on a number of non-zero parameters in at least one layer of the encoder.

7. The method of claim 1, wherein:
the media objects comprise image files.

8. The method of claim 1, wherein:
the media objects comprise at least two media types from a set comprising audio files, video files, image files, and text files.

9. A non-transitory computer readable medium storing code for information retrieval, the code comprising instructions executable by at least one processor to:
generate a dense image embedding for a plurality of media objects;
generate a sparse image embedding with a higher number of dimensions than the dense image embedding for each of the media objects using an encoder that takes the dense image embedding as an input, wherein the sparse image embedding is generated using an activation function including a sparsity constraint that limits a number of non-zero parameters at a hidden layer of the encoder; and
perform a search of the plurality of media objects based at least in part on the sparse image embedding and retrieve a matching object from the plurality of media objects based on the search.

10. The non-transitory computer readable medium of claim 9, wherein:
at least one layer of the encoder comprises an intermediate layer of an auto-encoder during a training phase.

11. The non-transitory computer readable medium of claim 9, wherein:
the sparsity constraint comprises a limit on a number of non-zero parameters in at least one layer of the encoder.

12. The non-transitory computer readable medium of claim 9, the code further comprising instructions executable by the at least one processor to:
store the plurality of media objects.

13. The non-transitory computer readable medium of claim 9, the code further comprising instructions executable by the at least one processor to:
generate an additional dense embedding for additional media objects having a different media type from the plurality of media objects.

14. An apparatus comprising:
a processor; and
a memory including instructions executable by the processor to:
generate a dense image embedding for each of a plurality of media objects to be searched;
generate a sparse image embedding with a higher number of dimensions than the dense image embedding for each of the media objects using an encoder that takes the dense image embedding as an input, wherein the sparse image embedding is generated using an activation function including a sparsity constraint that limits a number of non-zero parameters at a hidden layer of the encoder;
perform a search on the plurality of media objects based at least in part on the sparse image embedding; and
retrieve a matching object from the plurality of media objects based on the search.

15. The apparatus of claim 14, further comprising instructions executable by the processor to:
receive a query object of the plurality of media objects;
generate a sparse query embedding for the query object, wherein the search is based on the sparse query embedding;
identify the matching object similar to the query object based on the search; and
present the matching object to a user.

16. The apparatus of claim 14, further comprising instructions executable by the processor to:
receive a text query;
identify the matching object corresponding to the text query based on the search; and
present the matching object to a user.

17. The apparatus of claim 14, further comprising instructions executable by the processor to:
store the media objects and the sparse image embedding in a database;
identify a stored media object based on the search; and
retrieve the stored media object from the database.

18. The apparatus of claim 14, wherein:
the sparsity constraint comprises a limit on a number of non-zero parameters in at least one layer of the encoder.

\* \* \* \* \*